Figure 1:
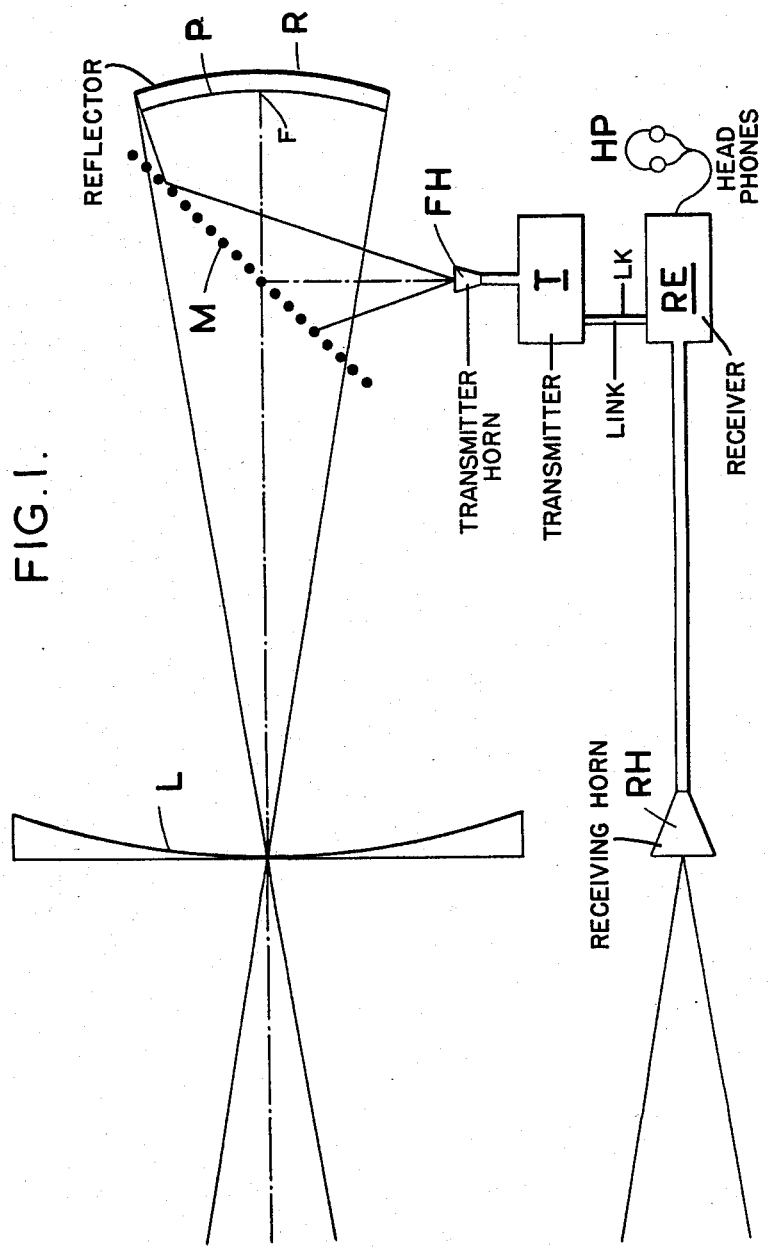

Nov. 1, 1960 J. F. RAMSAY 2,958,863
RADIO DIRECTION FINDERS
Filed Aug. 24, 1953 2 Sheets-Sheet 1

Inventor:
John Forrest Ramsay;
By his attorneys,
Baldwin & Wright

Nov. 1, 1960 J. F. RAMSAY 2,958,863
RADIO DIRECTION FINDERS
Filed Aug. 24, 1953 2 Sheets-Sheet 2
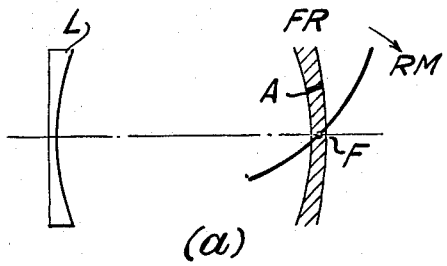
Fig.2.
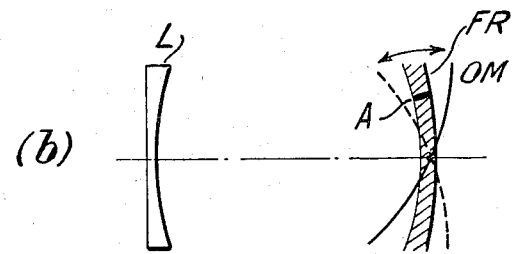
Fig.3.
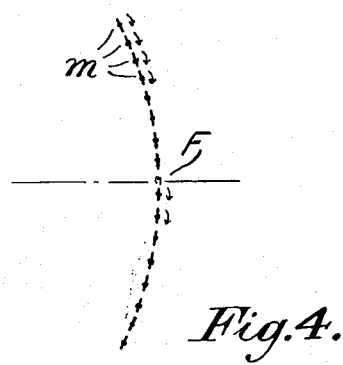
Fig.4.
Inventor:
John Forrest Ramsay;
By Baldwin & Wight, Attys.

United States Patent Office 2,958,863
Patented Nov. 1, 1960

2,958,863

RADIO DIRECTION FINDERS

John Forrest Ramsay, Great Baddow, England, assignor to Marconi's Wireless Telegraph Company Limited, London, England, a company of Great Britain Filed Aug. 24, 1953, Ser. No. 376,160

Claims priority, application Great Britain Sept. 2, 1952

5 Claims. (Cl. 343—16)

The present invention relates to radio direction finders.

The direction finder according to the invention, may be used for determining the direction in azimuth or in elevation or both of a stationary body or for determining the bearing of a beacon.

In my application Serial Number 361,770, filed June 15, 1953, for Radio Beacons, now Patent No. 2,917,740, issued Dec. 15, 1959, I have described a radio beacon in which a mirror to which movement is applied imparts a frequency shift to C.W. radio energy reflected thereby and received from a co-operating mobile station, the extent of the frequency shift depending upon the part of the mirror upon which the radio frequency energy falls, which in turn depends upon the angle between a line joining the moble craft and beacon on the one hand and a datum line which is the axis of a lens by which the radio frequency energy is focused upon the mirror on the other hand. In the arrangements described in the said specification, the beacon is passive in the sense that it is a reflector or frequency shifter only, and the mobile craft is active in the sense that it is the source of the radio energy. The extent of frequency shift imparted to the reflected wave as received on the mobile craft can be interpreted on the craft as an indication of whether it is on course towards the beacon or is off course.

According to one embodiment of the present invention, a radio direction finder comprises a wide-angle lens upon which radio energy is directed from a reflector rotating or oscillating about an axis perpendicular to the axis of the lens and in the focal area of said lens to produce in a space field a rotating radio image of said reflector whereby targets in different positions in said space field will reflect differently Doppler frequency-shifted energy, and a receiver having means for receiving the frequency-shifted reflected radio energy transmitted so as to detect the frequency modulation of the reflected energy, and thereby to determine the direction of a target.

According to a second embodiment of the invention, a radio direction finder comprises a transmitter adapted to radiate into an area in space a wide angle beam of continuous wave radio energy, a wide angle radio lens for receiving energy after reflection by a target in said area, means situated in the focal area of said lens for differently modulating reflected energy in dependence upon the direction in space from which it is received, and means for detecting the modulation.

In this second embodiment, the means situated in the focal area of the lens for modulating reflected energy may comprise a reflector adapted to rotate or oscillate about an axis perpendicular to the axis of the lens so as to impart a Doppler frequency shift to the energy received from a target depending upon its direction.

Alternatively, in either embodiment, the means situated in the focal area of the lens, for modulating radiated or received energy may comprise amplitude-modulating means in or near the focal area of the lens for periodically modulating the amplitude of radio energy transmitted from or received in said area, the periodic frequency of modulation being different in different parts of said area so as to impart a frequency to amplitude modulation of the energy transmitted into the free space field or received from a target in that field, depending upon the direction of the target.

In either embodiment, the reflector may comprise an assembly of small mirrors, instead of a single large mirror, the small mirrors rotating at different rates. Instead of the small mirrors rotating, they may have imparted to them linear oscillatory movement the velocities or accelerations of the mirrors being different inter se.

The amplitude-modulating means may comprise a so-called radio-siren including a disc adapted to rotate about an axis coincident with the axis of the lens and having a number of rings of perforations, the number of perforations in each ring being different.

A transmitting or multi-receiver head may be situated behind the siren with at least one component head situated behind each ring of perforations.

The invention is further described with reference to the accompanying drawings. Of the figures Fig. 1 illustrates both embodiments of the invention; Figs. 2 and 3 illustrate graphically the response of a rotating and oscillating mirror respectively; and Fig. 4 illustrates a reflector comprising an assembly of small "mirrors."

In the arrangement shown in the Fig. 1 a C.W. transmitter T is connected to a feed horn FH which "illuminates" a polarized mirror M, for example a grating, the polarization being perpendicular to the plane of the paper, say "vertical." The radiation is then reflected on to a quarter wave plate P backed by a reflector R. Since this dual component P, R is effectively a half wave plate the polarization of the radiation reflected from it can be made horizontal, that is in the plane of the paper (the terms "vertical" and "horizontal" are used for convenience, not with any limiting force). Such radiation will pass through the polarized mirror M and illuminate a wide angle lens L, at which it is collimated and radiated into space. The quarter-wave plate P operates to change the plane of polarization of the radio waves in very much the same way as a quarter-wave plate operates inside a waveguide. The action of a quarter-wave plate or grating is described in M.I.T. Radiation Laboratory Series, volume XII at page 447, with reference to Fig. 12.15, and also in the book "Antennas," by Kraus, published by McGraw-Hill, on page 431. Such quarter-wave plates or gratings are well known in the art.

In order to secure a sharp sided wide angle pattern the transmitter horn FH is focussed on the center of the wide angle lens L by, for example, the rear reflector R being made effectively elliptical. The reflector R is situated at or near the focus F of the lens L.

If the rear reflector is rotated about an axis, hereinafter referred to as the "axis of rotation," perpendicular to the plane of the paper, and through the focus of the lens, in any given direction in space there is produced a radiation which is characteristically frequency modulated for that direction. Echoes from targets in different directions in this area will then be reflected with differing radio frequencies, that is they will be differentially Doppler modulated though the targets may be static.

A simple wide angle receiving horn RH is provided at the receiver (which may be situated at or near to the transmitter station) and receives the modulated echoes: these will pass to the receiver RE where they will be mixed with the original transmitter frequency, of which a suitable portion is coupled to the receiver over the link LK. This will result in the detection of the differential modulations. The modulation frequencies may be, or may be changed so that they are, in the audio spectrum. It will thus be possible acoustically to determine directions of targets by means of the head-phones HP. Directions will be acoustically analyzable in the headphones. By this is meant that although a left-right ambiguity exists in that high frequency notes might detect that the target is to the left of the lens axis when the reflector is in one position or it might indicate that the image is to the right of the lens axis when the reflector R is in the other extreme position, this ambiguity is obviated by the listener who observes the position of the antenna in order to decide from which direction the reflections were received.

The arrangement of Fig. 1 can be adapted to purposes of the second embodiment, by merely changing the roles of the transmitter and receiver. It is evident, that if this be done, the transmitting horn will illuminate the target which reflects a wave towards the lens which focusses the received energy onto the reflector R (T now being regarded as such). The energy reflected from the mirror has its polarization turned through 90° by means of the shorted λ/4 plate-reflector combination P, R and by being then reflected into the receiver by a polarized mirror M.

In this rearrangement of the system, the energy both as transmitted and as reflected by a target anywhere in the illuminated field, will not be Doppler modulated, but since the reflected energy will fall upon a part of the rotating reflector combination P, R corresponding to a particular direction in space it will there receive a Doppler modulation depending on the part of the rotating combination upon which it falls, that is upon the direction of the reflecting target.

Many modifications may be made to the arrangements described, thus far.

For example the λ/4 plate P need not be attached to the moving reflector R but may be separate and stationary.

Moreover, the reflector may be mechanically modulated by methods other than rotation. Thus, for example, it may be oscillated about the "axis of rotation" instead of being rotated about that axis.

The difference between the responses in the cases of rotating and oscillating mirrors may be explained by means of Figs. 2 and 3 respectively. At (a) of Fig. 2 the rotating mirror RM is placed at the focus F of lens L. The shaded region FR is the effective focal region of the lens L; of which A is a typical element. A is "struck" by the mirror RM and produces Doppler modulation for the directions in space corresponding to A, with a frequency of repetition determined by the angular speed of the mirror. At (a') of Fig. 2 is shown the form of the response for a retaining mirror. At (b) of Fig. 3 is shown the arrangement in which the mirror OM is not allowed to revolve around an axis of rotation but oscillates backwards and forwards about an axis of oscillation corresponding to the axis of rotation through the focus. The oscillating mirror OM will as before strike the element A in the focal region FR in a similar way as in the arrangement of Fig. 2, to produce Doppler modulation, but its repetition frequency for bursts of Doppler is much higher since the lost time (that is the time wasted by the mirror rotating through 360°, as in Fig. 2) is reduced. This modification has been verified experimentally in an embodiment and quasi-continuous Doppler modulation was obtained. At (b') of Fig. 3 the "closing up" effect is illustrated. Although phase coherence is shown in this diagram, this does not necessarily obtain. Thus, with a rotating mirror, an on-off effect is produced whilst with an oscillating mirror on-off pulsations of Doppler modulation are obtained only if the oscillations through a given element are of large amplitude.

Since the oscillating mirror can be arranged to have suitably small excursions of amplitude of movement, yet adequately large to produce Doppler notes and since the vibration frequency can be arranged to be adequately high such that it compares with a rotating mirror in the production of similar Doppler modulation, the oscillating mirror, in so far as it provides a very significant reduction in lost-time, is a preferred modulating-reflector.

As has been observed, the reflector may consist of an assembly of small mirrors. This is illustrated in Fig. 4. In this figure, the separate reflecting elements of the reflector are indicated by the short lines m, all lying in the focal area. Each element is caused to oscillate, each being given a suitable velocity and/or acceleration different from that of all the rest. This may be effected by small vibrators so that for example each element is itself a vibrating mirror to each of which a different velocity is designedly imparted. In general, it may be said, that a single large mirror has to be driven and its Doppler properties are derived from the different linear velocities of its different parts when rotated, whereas when, instead of a large mirror, the reflector is composed of an assembly of small elements oscillated as stated, different modulations in the different focal regions can be obtained with greater freedom of design in coding the different spatial directions and, the entire structure is not required to oscillate. Further the reflector need not necessarily be an elliptical mirror, it may be a zoned reflector, or a lens corrected mirror. The polarized mirror may be a "cut-off" metal plate mirror of strips.

Although the descriptions have been limited to azimuth bearings, it is clear that the system can be extended to code, by an appropriate internal amplitude modulation, any direction in space.

The "display" is not limited to headphones but can utilize frequency meters, frequency analyzers, etc.

While I have described my invention in certain of its preferred embodiments, I realize that modifications may be made, and I desire that it be understood that no limitations upon my invention are intended other than may be imposed by the scope of the appended claims.

I claim:

1. In a directional radio system, a transmitter, a receiver, a wide angle radio lens adapted to pass radio beam energy incident thereon from any one of a plurality of different directions lying within said wide angle, a plane polarized grating, and means in the focal plane of said lens and extending substantially over said wide angle for differently characteristically phase modulating differently directed radio beams propagated within said angle according to the angle at which said beams are incident upon said lens, said transmitter being positioned to direct radio frequency energy onto said grating from whence it is reflected onto said means.

2. A directional radio system as set forth in claim 1 wherein said means comprises a movably mounted reflector adapted to change the plane of polarization of a plane polarized incident beam through substantially 90° on reflecting the same, and wherein said grating extends across said wide angle and between said reflector and said lens and is adapted to pass substantially without attenuation radio energy plane polarized in one predetermined plane and to reflect radio energy plane polarized in a plane perpendicular to said predetermined plane.

3. In combination, in a directional radio system, a wide angle radio lens adapted to pass radio beam energy incident thereon from any of a plurality of different directions lying within said wide angle; and means in the focal plane of said lens and extending substantially over said angle for differently characteristically phase modulating differently directed radio beams propagated within said angle, said means comprising a movably mounted reflector adapted to change the plane of polarization of a plane polarized incident beam through substantially 90° on reflecting the same; a plane polarized grating extending across said wide angle and between said reflector and said lens and adapted to pass substantially without attenuation radio energy plane polarized in one predetermined plane and to reflect radio energy plane polarized in a plane perpendicular to said predetermined plane; a radio transmitter mounted to project a wide angle radio beam upon said grating, and a radio receiver responsive to energy reflected from a reflecting object in space and in the path of a beam which has been reflected by said reflector through said lens to space.

4. In combination, in a directional radio system, a wide angle radio lens adapted to pass radio beam energy incident thereon from any one of a plurality of different directions lying within said wide angle; means in the focal plane of said lens and extending substantially over said angle for differently characteristically phase modulating differently directed radio beams propagated within said angle, said means comprising a movably mounted reflector adapted to change the plane of polarization of a plane polarized incident beam through substantially 90° on reflecting the same; a plane polarized grating extending across said wide angle and between said reflector and said lens and adapted to pass substantially without attenuation radio energy plane polarized in a plane perpendicular to said predetermined plane; a radio transmitter arranged to transmit energy into space and a radio receiver mounted to receive a radio beam from said grating and responsive to energy reflected from a reflecting object in space and in the path of said transmitted energy, which has been directed by said lens into said reflector.

5. A directional radio system as set forth in claim 1 wherein said means comprises a plurality of movably mounted reflectors having, inter se, different velocities of movement, adapted to change the plane of polarization of a plane polarized incident beam through substantially 90° on reflecting the same, and wherein said system includes a plane polarized grating extending across said wide angle and between said reflectors and said lens and adapted to pass substantially without attenuation radio energy plane polarized in one predetermined plane and to reflect radio energy plane polarized in a plane perpendicular to said predetermined plane.

References Cited in the file of this patent

UNITED STATES PATENTS

| | | |
|---|---|---|
| 2,443,643 | Schelleng | June 22, 1948 |
| 2,452,349 | Becker | Oct. 26, 1948 |
| 2,468,042 | Cranberg | Apr. 26, 1949 |
| 2,523,455 | Stewart | Sept. 26, 1950 |
| 2,571,163 | Rines | Oct. 16, 1951 |
| 2,820,906 | Miller | Jan. 21, 1958 |